United States Patent [19]

Spadone

[11] 4,279,284
[45] Jul. 21, 1981

[54] PNEUMATIC RUBBER TIRE CONTAINING ENHANCED INNER LINER OR INNER TUBE

[75] Inventor: Leighton R. Spadone, Akron, Ohio

[73] Assignee: The Goodyear Tire & Rubber Company, Akron, Ohio

[21] Appl. No.: 95,117

[22] Filed: Nov. 16, 1979

[51] Int. Cl.³ ............................................. B60C 5/14
[52] U.S. Cl. .............................. 152/330 R; 152/349; 152/374; 152/DIG. 16; 156/124
[58] Field of Search ................... 156/118, 123 R, 124; 152/330 R, 349, 357 R, 374, DIG. 16

[56] References Cited

U.S. PATENT DOCUMENTS

| 3,808,177 | 4/1974 | Thaler et al. ........................ 525/332 |
| 3,960,628 | 6/1976 | Snyder .............................. 156/123 |
| 4,014,852 | 3/1977 | Gessler et al. .................. 156/118 X |
| 4,039,506 | 8/1977 | Gessler et al. .................. 156/118 X |
| 4,113,804 | 9/1978 | Cotten et al. .................... 525/211 X |

FOREIGN PATENT DOCUMENTS 1023217  12/1977  Canada .

OTHER PUBLICATIONS

Amoco Polybutenes Bulletin 12-H, "Versatile Liquid Polymers Designed to Work for You", pp. 4, 5, 14, 15.

*Primary Examiner*—John E. Kittle
*Attorney, Agent, or Firm*—H. C. Young, Jr.

[57] ABSTRACT

Pneumatic rubber tire containing reinforcing steel elements therein characterized in that said tire has an adherent inner liner or an inner tube with its polymer portion comprised of a halobutyl rubber and/or copolymers of isobutylene and cyclopentadiene mixed with a prescribed polybutene polymer.

11 Claims, 1 Drawing Figure

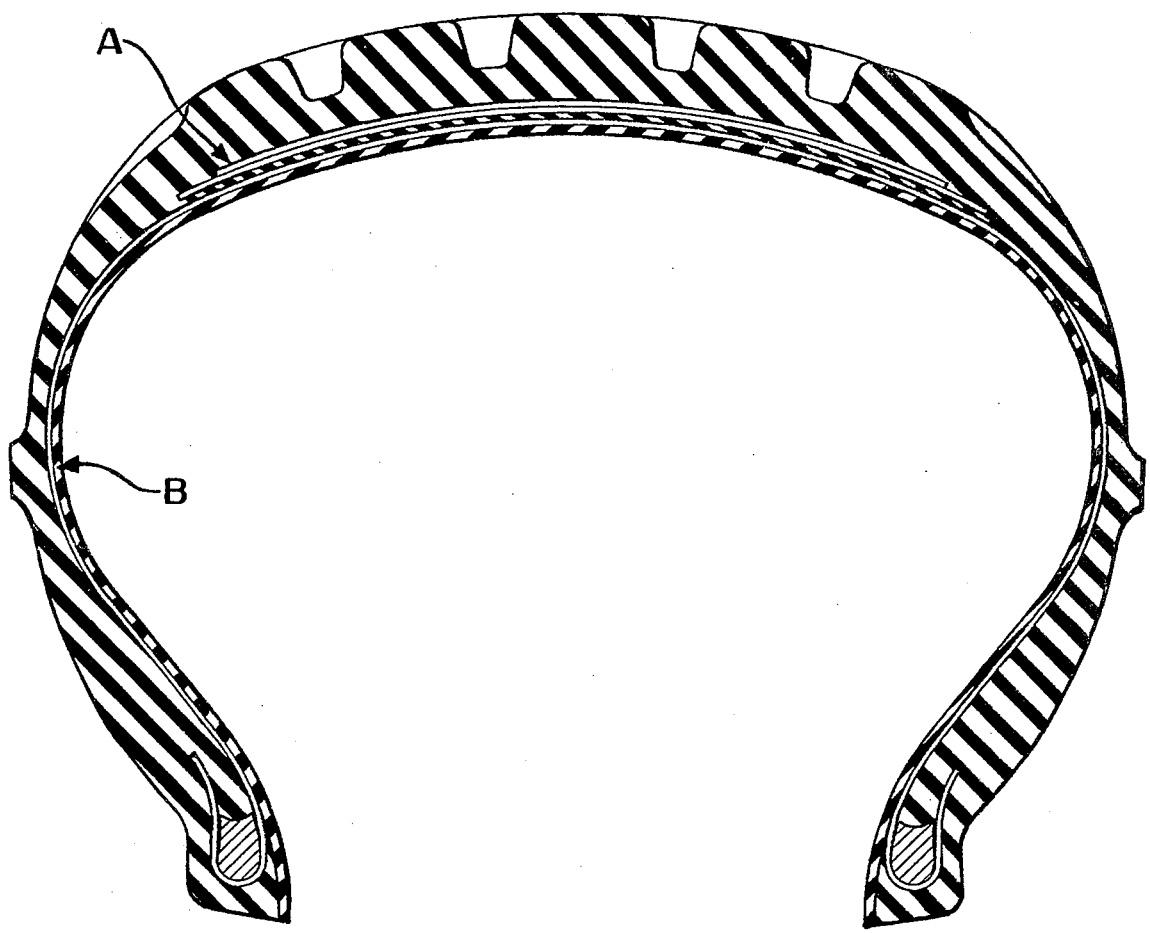

PNEUMATIC RUBBER TIRE CONTAINING ENHANCED INNER LINER OR INNER TUBE

FIELD OF INVENTION

This invention relates to metal reinforced pneumatic rubber tire containing an enhanced inner liner and/or inner tube compositions.

BACKGROUND OF THE INVENTION

Inner tubes have been used for decades in pneumatic tires. Inner liners have been used for many years in tubeless pneumatic vehicle tires to prevent the escape of air used to inflate the tire, thereby maintaining tire pressure. For example, see U.S. Pat. No. 3,960,628, the inner liner 25 in FIG. 1. Materials which are relatively impermeable to air are used in said inner liners and inner tubes and can include butyl rubber and halobutyl rubbers. U.S. Pat. No. 3,808,177 reveals polymers which are also relatively impermeable.

The inner liner is normally prepared by conventional calendering techniques and as a result often requires the use of a processing aid. Materials used in the preparation of inner tubes also normally require a processing aid.

With the introduction of metal-reinforced tires, for example, steel-belted radial tires, problems have arisen regarding metal-to-rubber adhesion and metal cord failure.

It is well known that moisture can cause the breakdown of the adhesion system between the metal of the reinforcement elements and the rubber adjacent thereto, which can result in the failure of the tire. It is also well known that moisture can cause corrosion of the metal to such a degree that total failure of the reinforcement element itself can occur.

Various methods have been used to prevent the breakdown of this adhesion system and to prevent corrosion of the metal such as by treatment of the metal itself.

There is a need, however, for other techniques to prevent the failure of metal-reinforced pneumatic tires.

Indeed, it has been found that low water vapor, or moisture, and low air diffusion or permeability are important as tire inner liner characteristics for metal, particularly steel cord in its brass coated state, reinforced rubber tire.

However, it is sometimes important to improve the processability of the liner rubber compound or compounded rubber, during its mixing, calendering and/or shaping step(s). Although such processability improvement for rubber compounds is conventionally achieved by adding or increasing rubber processing oil, such addition generally degrades moisture and/or air diffusion through the prepared inner liner in the metal cord reinforced rubber tire which, in turn, generally degrades the metal to rubber adhesion.

Therefore, it is an object of this invention to provide a metal reinforced pneumatic rubber tire having an enhanced inner liner.

It is a further object of the present invention to provide a method of preventing or retarding corrosion of the metal reinforcement element of metal-reinforced pneumatic vehicle tires and the failure of the adhesion system between the element and the rubber adjacent thereto. It is also an object of the present invention to provide a special inner liner or inner tube for steel-belted pneumatic vehicle tires. Other objects will become apparent as the description proceeds.

DISCLOSURE AND PRACTICE OF THE INVENTION

The objects of the present invention are accomplished by providing metal-reinforced pneumatic rubber tires with an inner liner or an inner tube comprised of a highly impermeable rubber composition containing as a processing aid, a polybutene polymer.

In accordance with this invention, a pneumatic rubber vehicle tire is provided which contains reinforcing steel elements therein, said elements selected from at least one of steel elements and metal-coated steel elements, characterized in that said tire has an adherent inner liner comprised of (A) 100 parts by weight of at least one polymer selected from halobutyl rubber and/or copolymers of isobutylene and cyclopentadiene and (B) about 1 to about 25 parts by weight polybutene polymer per 100 parts by weight (A), said polybutene polymer having a number average molecular weight in the range of about 200 to about 3000.

Several processing oils which have been used successfully as processing aids for tire inner liners where air retention within the tire cavity is the major concern were found to be relatively unsatisfactory in inner liners for metal-reinforced tires where impermeability to moisture is also a concern. The reason for the difference apparently involves the degree of permeability. Where air retention is of prime concern, the escape of small amounts of air has essentially no effect on the amount of retained air and, therefore, little effect on tire pressures. However, where moisture is of prime concern, it is not the amount of moisture retained within the tire cavity that is important, but rather the amount of moisture escaping to adversely affect the metal-to-rubber adhesion system and the corrosion resistance of the metal. The escape of even minute amounts of moisture has the potential of adversely affecting bonding and can result in corrosion.

Polybutene was found to be superior to the processing oils tested re moisture impermeability. Although the addition of polybutene to the impermeable rubber does reduce the impermeability to some extent, it did not do so to the degree that the processing oils tested did, possibly since polybutene itself is known to be relatively impermeable.

Polybutene is essentially a homopolymer of isobutene and is described in the Amoco Polybutenes Bulletin 12-H. The contents of said bulletin are incorporated herein by reference with special emphasis on pages 4, 5, 14 and 15. Although the molecular weight can vary, the polybutenes used as processing aids are normally low molecular weight polymers having a number average molecular weight of from about 200 to 3000.

The relatively impermeable rubbers include butyl rubber, halobutyl rubbers such as chlorobutyl rubber and bromobutyl rubber, and copolymers of isobutylene and cyclopentadiene, e.g. copolymers of isobutylene and cyclopentadiene (CPD) containing 10 to 50 parts by weight of bound CPD. The butyl rubber and halobutyl rubbers are well known in the art. The copolymers of isobutylene and cyclopentadiene such as chlorobutyl and bromobutyl rubber, are sold by Exxon Chemical Company and are referred to as HDR polymer systems. Copolymers of isobutylene and cyclopentadiene are described in U.S. Pat. No. 3,808,177 which is incorporated herein by reference. It must be understood that the term moisture impermeable rubbers is a relative term and is not intended to limit such compositions to polymers which permit no moisture whatever to pass through the inner liner. Rather, it is intended to include those polymers used in the art as inner liner and inner tube compositions which are less permeable to air and moisture than conventional polymers such as natural rubber and butadiene/styrene copolymers. The term also is not intended to include low molecular weight polybutenes useful as processing aids.

The impermeable rubbers may be combined with other conventional polymers such as natural rubber, butadiene/styrene copolymers, butadiene/acrylonitrile copolymers, polybutadiene and synthetic polyisoprene. However, as more of the conventional rubber is combined with the impermeable rubber, the impermeability of the blend decreases.

It is believed that the ability of the polybutene to offer improved impermeability over other processing aids such as processing oils may be totally destroyed by the addition of too large an amount of a conventional rubber. This belief is based on the fact that a 100% natural rubber composition containing polybutene possessed the same impermeability as natural rubber containing a processing oil. Since permeability of a blend will vary depending upon the particular conventional rubber used, the state of vulcanization, the thickness of the inner tube or inner liner, and temperature, it is not possible to state at what level of conventional rubber the effectiveness of the polybutene will still remain. However, such limits can be determined by routine experimentation. As a guideline, it is believed that the level of impermeable rubber in the total rubber compositions (sans polybutene) may be from 20 to 100 parts by weight.

The amount of polybutene is determined by the particular stock being processed and the manner of processing. As a guideline, but not a limitation, levels of from 1 to 25 parts by weight are normally used per 100 parts by weight of total polymer excluding the polybutene.

Metal-reinforced pneumatic tires are those tires possessing belt, chippers or plies, containing reinforcing elements of steel, the steel being uncoated or coated with metallic coatings such as brass or zinc. Steel belts are shown as 21 and 23 in FIG. 1 of U.S. Pat. No. 3,960,628.

Inner liners as indicated earlier herein are extremely well known in the art and are normally merely membranes of rubber covering the entire inner surface of a pneumatic tire. They are normally reinforced with carbon black.

The pneumatic tires may be passenger tires or truck tires or any other type of metal-reinforced pneumatic tire, bias or radial.

The metal reinforced pneumatic vehicle tire having an inner liner is presented in the attached FIGURE where (A) is a two-ply steel belt and (B) is an inner liner. Tires without an inner liner can be used with an inner tube containing the composition of the present invention.

The following example illustrates but does not limit the practice of the present invention. Unless indicated otherwise, all parts are parts by weight.

EXAMPLE

Vapor diffusion tests were run on inner liner stocks having the following formulation.

|  | Parts by Weight |
|---|---|
| Highly Impermeable Rubber Stock | 100 |
| Carbon Black | 70 |
| Polybutene or Processing Oil | 0 or 10 |
| Curatives (sulfur type system) | 5 |
| Total | 185 |

Runs were made with processing oil while others were made with polybutene. Chlorobutyl rubber, bromobutyl rubber and copolymers of isobutylene and cyclopentadiene were evaluated.

The average vapor diffusion results for controls containing no processing oil or polybutene were assigned a vapor diffusion rating of 100. Those compositions containing polybutene had a vapor diffusion rating (VDR) of 95 or above. Those containing a processing oil had VDR's of less than 50. The polybutene used was Amoco's H-300 while the processing oil used was a naphthenic/paraffinic medium processing oil.

A 60/40 chlorobutyl rubber/natural rubber combination containing a processing oil had a VDR of about 20.

A steel-belted radial tire with an inner liner or an inner tube prepared from any of the aforementioned inner liner compositions containing polybutene would be superior are metal cord/rubber adhesion retention and corrosion resistance to a similar liner containing a processing oil.

While certain representative embodiments and details have been shown for the purpose of illustrating the invention, it will be apparent to those skilled in the art that various changes and modifications may be made therein without departing from the spirit or scope of the invention.

What is claimed is:

1. A pneumatic rubber vehicle tire containing reinforcing steel elements therein, said elements selected from at least one of steel elements and metal-coated steel elements, characterized in that said tire has an adherent inner liner comprised of (A) 100 parts by weight of at least one polymer selected from halobutyl rubber and/or copolymers of isobutylene and cyclopentadiene and (B) about 1 to about 25 parts by weight polybutene polymer per 100 parts by weight (A), said polybutene polymer having a number average molecular weight in the range of about 200 to about 3000.

2. The metal reinforced pneumatic tire of claim 1 where said metal reinforcement is in the form of a belt of steel cords to form a steel belted radial tire.

3. The pneumatic tire of claim 1 where said steel reinforcement is coated with a metallic coating comprised of at least one of brass and/or zinc.

4. The pneumatic vehicle tire of claim 3 where the polymer portion of said inner liner is comprised essentially of (A) halobutyl rubber and (B) said polybutene polymer.

5. The pneumatic tire of claim 4 where said halobutyl rubber is chlorobutyl rubber.

6. The tire of claim 3 where said steel of its steel belt has a metallic coating of at least one of brass and/or zinc and where said adherent inner liner is comprised of (A) chlorobutyl rubber and (B) polybutene polymer.

7. A pneumatic rubber vehicle tire having steel cord reinforcement therein, where said steel is optionally coated with a metallic coating selected from at least one of brass and/or zinc, the improvement wherein said tire has an inner tube therein comprised of (A) 100 parts by weight of at least one polymer selected from at least one of halobutyl rubber and copolymers of isobutylene and cyclopentadiene and (B) about 1 to about 25 parts by weight of a polybutene polymer per 100 parts by weight (A), said polybutene polymer having a number average molecular weight in the range of about 200 to about 3000.

8. The pneumatic rubber vehicle tire of claim 1 where said reinforcing steel elements are steel cords optionally coated with a metallic coating selected from at least one of brass and/or zinc, characterized in that said tire has an adherent inner liner comprised of (A) 100 parts by weight of at least one polymer selected from chlorobutyl rubber, bromobutyl rubber and/or copolymers of isobutylene and cyclopentadiene as a rubber containing 10 to 50 parts by weight bound cyclopentadiene about 1 to about 25 parts by weight polybutene polymer, said polybutene polymer being essentially a homopolymer of isobutene and having a number average molecular weight in the range of about 200 to about 3000.

9. The metal reinforced pneumatic tire of claim 8 where said metal reinforcement is in the form of a belt of such steel cords to form a steel belted radial tire.

10. The pneumatic vehicle tire of claim 8 or 9 where the polymer portion of said inner liner is comprised essentially of (A) chlorobutyl or bromobutyl rubber and (B) said polybutene polymer.

11. The pneumatic tire of claim 8 or 9 where the polymer portion of said inner liner is comprised essentially of (A) said copolymer of isobutylene and cyclopentadiene and (B) said polybutene polymer.

* * * * *